United States Patent Office 3,014,022
Patented Dec. 19, 1961

3,014,022
N-TRITYL PEPTIDES AND A PROCESS OF PRODUCING SAME
Gaston Amiard, Noisy-le-Sec, Rene Heymes, Romainville, and Leon Velluz, Paris, France, assignors to UCLAF, Paris, France, a French body corporate
No Drawing. Filed July 16, 1958, Ser. No. 748,807
Claims priority, application France July 22, 1957
5 Claims. (Cl. 260—112)

The present invention relates to N-trityl peptides and more particularly to N-trityl peptides of amino dicarboxylic acids, and to a process of producing the same.

In co-pending application Serial No. 527,634, filed August 10, 1955, now Patent No. 2,994,692, and entitled "Process of Producing Peptides and Products Obtained Thereby," of which this application is a continuation-in-part, a process of preparing peptides has been described which process consists in first producing, as an intermediate, the corresponding N-trityl peptide. More particularly, said process consists in preparing an N-trityl amino acid, converting said acid into its mixed anhydride, and reacting the latter with an ester of an amino acid or a peptide. The resulting condensation product is then saponified in order to set free the carboxyl group and is detritylated by heating with aqueous 50% acetic acid. Certain N-tritylated amino acids, however, cannot readily be converted into the corresponding peptides by such a process using mixed anhydrides. Such peptide synthesis, however, is readily accomplished by following the process disclosed in co-pending application Serial No. 594,106, filed June 27, 1956, now Patent No. 2,932,634, and entitled "Process of Producing Peptides and Products Obtained Thereby." According to said method the N-trityl amino acids are readily converted into the corresponding N-trityl peptides by reaction with an amino acid ester in the presence of dicyclohexyl carbodiimide. Saponification and detritylation of the resulting condensation product with aqueous 50% acetic acid yield the desired N-peptide.

In co-pending application Serial No. 596,151, filed July 6, 1956, now Patent No. 2,933,487, of which this application is a continuation-in-part, and entitled "Method of Producing L-glutamyl Peptides," the production of peptides containing L-glutamic acid of Formula I I 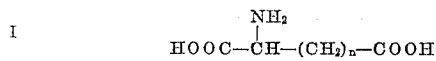

wherein $n=2$ is described.

Various natural polypeptides comprise as part of the peptide chain constituting these compounds one or several glutamyl peptide groups, and the herein claimed process permits the preparation of L-glutamyl peptides. These compounds can then be introduced into other peptide molecules in order to synthesize more complex compounds, such as higher polypeptide chains. Moreover, these glutamyl peptides as such are of great interest in biology and practical nutrition.

Not only is glutamic acid a part of biologically important peptides but also other dibasic amino acids, for instance, aspartic acid of Formula I, wherein $n=1$. In many of such peptides one carboxyl group is present in the form of a carboxylic acid amide group of the formula —$CONH_2$ while the other carboxyl group is linked to the amino group of another amino acid or peptide by a peptide bond (—CO—NH—).

The biological importance of carboxamido acids, such as glutamine, isoglutamine, and asparagine is well known in the art. Carboxamido substituted peptides of high physiological interest and importance are also known. For instance, the hormones of the posterior lobe of the pituitary gland, i.e., oxytocin and vasopressin are described as peptides containing asparagine and glutamine (see J. M. Swan and V. Du Vigneaud, J. Am. Chem. Soc., vol. 76 (1954), p. 3110). Furthermore, asparaginyl peptides have a remarkable effect on the growth of microorganisms. For instance, asparaginyl leucine shows a considerable influence on the growth of *Leuconostoc mesenteroides* and glutamyl glycine and asparaginyl glycine effect the growth of *Lactobacillus arabinosus* and *Leuconostoc mesenteroides*.

It is therefore one object of the present invention to provide a new, simple, and valuable process of producing peptides containing carboxylamido groups.

Another object of the present invention is to provide new and valuable tritylated derivatives of such peptides.

Still another object of the present invention is to provide starting materials and intermediates for the synthesis of producing such peptides containing carboxamido groups.

These and other objects of the present invention and advantageous features thereof will become apparent as the description proceeds.

In principle, the present invention relates to peptides of the general Formula II:

II 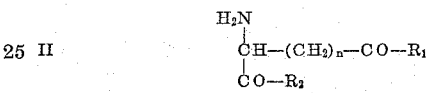

wherein $R_1$ and $R_2$ indicate members selected from the group consisting of an amino group, an α-amino carboxylic acid group attached to the —CO— group by its amino nitrogen atom, a peptide group attached to the CO-group by its free amino nitrogen atom, and such α-amino carboxylic acid and peptide groups the free carboxyl group of which is converted into a lower alkyl or aralkyl ester group and only one of said substituents $R_1$ and $R_2$ being an amino group, while $n$ is an integer between 1 and 3, and to the corresponding N-tritylated derivatives of such peptides of the general Formula III III 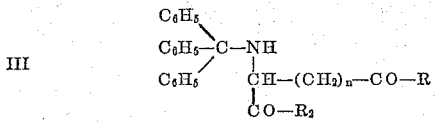

wherein $R_1$ and $R_2$ and $n$ represent the same members as indicated hereinabove.

According to the present invention, peptides containing carboxamido groups are prepared by reacting an N-tritylated amino acid substituted by a carboxamido group, i.e., a dibasic N-tritylated amino acid of the general Formula I, given hereinabove, wherein $n$ is an integer between 1 and 3 and wherein one of the two carboxyl groups is present in the form of a carboxamido group, with an ester of an amino acid or a peptide containing a free amino group in a suitable solvent at low temperatures and in the presence of dicyclohexyl carbodiimide, separating the resulting discyclohexyl urea from the reaction mixture by filtration, saponifying the resulting N-trityl peptide ester, isolating the free N-trityl peptide compound by acidifying the reaction mixture by means of a lower aliphatic acid, and detritylating the N-trityl peptide compound by heating it with 50% aqueous acetic acid.

According to a preferred embodiment of the present invention, the condensation reaction wherein the new peptide bond is formed, is carried out at a temperature between about —10° C. and about 0° C. and in methylene chloride as solvent.

The resulting new carboxamido substituted N-trityl peptides according to the present invention may advantageously be used in the synthesis of polypeptides.

The following examples serve to illustrate the present invention without, however, limiting the same thereto.

3

More particularly, the nature of the solvent and of the reagents may be varied by those skilled in the art in accordance with the principles set forth herein and in the claims annexed hereto.

The melting points given in the examples are instantaneous melting points determined on the Maquenne block.

EXAMPLE 1

*Preparation of N-trityl-L-asparagine trityl ester (Formula III; $n=1$, $R_1=NH_2$, $R_2=O-C(C_6H_5)_3$)*

12 g. of trityl chloride are dissolved in 70 cc. of ether and added to a solution of 1.5 g. of the monohydrate of L-asparagine in 25 cc. of water and 7 cc. of triethylamine. The mixture is stirred for 3½ hours at 0° C. and thereafter is rendered slightly acid by the addition of dilute hydrochloric acid. The precipitate is filtered off, washed with water and then with ether. It is recrystallized from a mixture of benzene and ether (1:5). The yield is 83% of the theoretical amount. The compound melts at 218–222° C. and has a rotatory power of $[\alpha]_D^{20}=-64°\pm2°$ (concentration: 2% in chloroform). The compound is insoluble in water and ether, soluble in alcohol, acetone, benzene, chloroform, and ethyl acetate.

*Analysis.*—$C_{42}H_{36}O_3N_2=616.7$. Calculated: 81.8% C; 5.9% H; 7.8% O, 4.5% N. Found: 81.7% C; 6.0% H; 7.6% O, 4.7% N.

The compound has not been described in the literature.

EXAMPLE 2

*Preparation of N-trityl-L-asparagine benzyl ester (Formula III; $n=1$, $R_1=NH_2$, $R_2=O-CH_2-C_6H_5$)*

66 cc. of N potassium hydroxide solution are gradually added in small portions within 30 minutes to a boiling solution of 33.3 g. of N-trityl-L-aspartic acid dibenzyl ester obtained according to Velluz et al., Bull. Soc. Chim., 1956, p. 1464, in 180 cc. of dioxane and 30 cc. of water. 15 minutes after said addition, the dioxane is removed by distillation in a vacuum. The resulting solution is diluted with water, rendered acid by the addition of 70 cc. of N hydrochloric acid, and extracted with methylene chloride. The extracts are washed with water, dried over sodium sulfate, and concentrated by evaporation to a volume of about 100 cc. Gaseous ammonia is passed through the solution until the pH is between 8.0 and 9.0. 16 g. of dicyclohexyl carbodiimide are added to the mixture, the pH of which is maintained between about 8.0 and 9.0 by passing a slow stream of ammonia therethrough. After 2 hours, the precipitated dicyclohexyl urea (12.4 g. corresponding to 71%) is filtered off and the solvent is distilled off in a vacuum at 30° C. The residue is taken up with methanol and the crystals are filtered with suction. The yield is 12 g. (43% of the theoretical amount) of N-trityl-L-asparagine benzyl ester which, after recrystallization from absolute alcohol, melts at 166–167° C. and has a rotatory power of $[\alpha]_D^{20}=-5°\pm1°$ (concentration: 2% in chloroform). The compound is insoluble in water, slightly soluble in alcohol and ether, and soluble in chloroform.

*Analysis.*—$C_{30}H_{28}O_3N_2=464.5$. Calculated: 77.55% C; 6.0% H; 10.3% O, 6.00% N. Found: 77.3% C; 6.1% H; 10.7% O, 6.1% N.

The compound is new.

EXAMPLE 3

*Preparation of N-trityl-L-asparagine (Formula III; $n=1$, $R_1=NH_2$, $R_2=OH$)*

(a) BY HYDROLYSIS OF THE N-TRITYL-L-ASPARAGINE TRITYL ESTER 10 cc. of water and 5 cc. of pyridine are added to a solution of 10 g. of N-trityl-L-asparagine trityl ester obtained according to Example 1, in 200 cc. of acetone. The mixture is allowed to stand for one night at room temperature and the acetone is removed by distillation at 40° C. in a vacuum. The oily residue is taken up with 50 cc. of water and 50 cc. of ether and the pH of the mixture is rendered slightly acid by the addition of N hydrochloric acid. The precipitated hydrated N-trityl-L-asparagine (5.2 g., corresponding to 85% of the theoretical amount) is filtered off and recrystallized from methyl ethyl ketone. It has a melting point of 194–196° C. and a rotatory power of $[\alpha]_D^{20}=-7°$ (concentration: 2% in methanol). Zervas and Theodoropoulos, J. Am. Chem. Soc., vol. 78, p. 1359 (1956), give a melting point of 173–174° C. and a rotatory power of $[\alpha]_D^{20}=-6.1°$ (concentration: 3.5% in methanol). The compound is insoluble in ether, water, and benzene, slightly soluble in chloroform, and soluble in alcohol and acetone.

(b) BY HYDROGENOLYSIS OF THE N-TRITYL-L-ASPARAGINE BENZYL ESTER 2 g. of the N-trityl-L-asparagine benzyl ester obtained as described in Example 2, are subjected to the action of hydrogen in 40 cc. of ethyl acetate under atmospheric pressure at room temperature and in the presence of 0.2 g. of palladium precipitated on 0.5 g. charcoal and 0.6 cc. of triethylamine. After separation of the catalyst from the reaction mixture by filtration, the solution is stirred with 15 cc. of 0.3 N hydrochloric acid. Thereby, 1.3 g. (80% of the theoretical amount) of hydrated N-trityl-L-asparagine are obtained.

EXAMPLE 4

*Preparation of the diethylamine salt of N-trityl-L-asparagine (Formula III; $n=1$, $R_1=NH_2$, $R_2=OH.NH(C_2H_5)_2$)*

15 g. of the N-trityl-L-asparagine trityl ester obtained according to Example 1, are subjected to the action of hydrogen in 150 cc. of absolute alcohol at room temperature and under atmospheric pressure in the presence of palladium precipitated on charcoal and of 3 cc. of diethylamine. After separation of the catalyst by filtration, the solution is concentrated by evaporation to a volume of 10 cc. 0.5 cc. of diethylamine are added thereto and the desired salt is precipitated by the addition of 200 cc. of ether. 9.85 g. (90% of the theoretical amount) of the diethylamine salt of N-trityl-L-asparagine are obtained. The compound melts at 152–155° C. and has a rotatory power of $[\alpha]_D^{20}=-20°\pm2°$ (concentration: 1% in chloroform). (Zervas and Theodoropoulos, J. Am. Chem. Soc., vol. 78, p. 1359 [1956], give a meltin gpoint of 150–151° C.) The compound is insoluble in ether, slightly soluble in acetone, and soluble in water, alcohol, chloroform, and hot benzene.

EXAMPLE 5

*Preparation of N-trityl-L-asparaginyl glycine benzyl ester (Formula III; $N=1$, $R_1=NH_2$,*

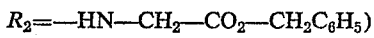

$R_2=-HN-CH_2-CO_2-CH_2C_6H_5$)

A mixture of 2.25 g. of the diethylamine salt of N-trityl-L-asparagine obtained according to Example 4, 1.01 g. of the hydrochloride of glycine benzyl ester, and 0.925 g. of N-trityl-L-asparagine obtained according to Example 3 in 40 cc. of methylene chloride is cooled to $-10°$ C. 1.6 g. of dicyclohexyl carbodiimide are added thereto. The mixture is stirred for 5 hours, whereby the temperature is allowed to rise slowly to 0° C. The precipitated dicyclohexyl urea is separated, the solvent is removed by distillation in a vacuum, and the residue is dissolved in 5 cc. of alcohol and 50 cc. of ether. The resulting solution is washed with 10 cc. of 15% aqueous alcohol containing small amounts of hydrochloric acid, then with 10 cc. of 15% aqueous alcohol, and finally with 10 cc. of 15% aqueous alcohol containing small amounts of ammonia. Purification is completed by washing the solution four times with 10 cc. of 15% aqueous alcohol. The resulting ethereal solution is dried over sodium sulfate and is evaporated to dryness. The residue is taken up with 20 cc. of ethyl acetate. The resulting solution is washed with water, dried, and evaporated to dryness. The residue is recrystallized from a mixture of alcohol and cyclohexane (1:10). The yield of crude product is 82% of the theoretical amount. After recrystallization from a mixture of alcohol and petroleum ether (1:10), the compound melts at about 160° C., has a rotatory power of $[\alpha]_D^{20}=-71°\pm1°$ (concentration: 1% in chloroform), and is insoluble in water, slightly soluble in alcohol, and soluble in ether, acetone, and chloroform.

Analysis.—$C_{32}H_{31}O_4N_3=521.6$. Calculated: 73.7% C; 6.0% H; 8.1% N. Found: 73.6% C; 5.8% H; 8.1% N.

The compound has not yet been described.

EXAMPLE 6

*Preparation of the diethylamine salt of N-trityl-L-asparaginyl glycine (Formula III; N=1, $R_1$=NH$_2$,*

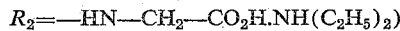

$R_2$=—HN—CH$_2$—CO$_2$H.NH(C$_2$H$_5$)$_2$)

1 g. of N-trityl-L-asparaginyl glycine benzyl ester, prepared according to the preceding example, is subjected to the action of hydrogen in the presence of 0.2 g. of palladium precipitated on 0.5 g. charcoal in 20 cc. of 95% alcohol containing 0.3 cc. of diethylamine. The reaction mixture is worked up as usual and the resulting residue is taken up in ether. On filtering off the precipitate, 0.86 g. (90% of the theoretical amount) of the diethylamine salt of N-trityl-L-asparaginyl glycine are obtained which are recrystallized from a mixture of alcohol and ethyl acetate (1:9). The compound has a melting point of 174–176° C., and a rotatory power of $[\alpha]_D^{20}=-48°\pm1°$ (concentration: 1% in absolute alcohol). The compound is insoluble in ether and benzene, slightly soluble in acetone, and soluble in water, alcohol, and chloroform.

Analysis.—$C_{29}H_{36}O_4N_4=504.6$. Calculated: 69.0% C; 7.2% H; 11.1% N. Found: 68.9% C; 7.2% H; 11.0% N.

The compound has not yet been described in the literature.

EXAMPLE 7

*Preparation of L-asparaginyl glycine—Formula II; n=1, $R_1$=NH$_2$, $R_2$=—NH—CH$_2$—CO$_2$H*

0.6 g. of the diethylamine salt of N-trityl-L-asparaginyl glycine obtained according to Example 6 are heated in 1 cc. of water and 1 cc. of acetic acid at 50° C. for 5 minutes. The reaction mixture is diluted with 5 cc. of water and precipitated triphenyl carbinol is separated by filtration. The resulting filtrate is concentrated in a vacuum until crystallization sets in. On addition of 10 cc. of hot alcohol and cooling of the reaction mixture, 0.19 g. (85% of the theoretical amount) of the desired L-asparaginyl glycine are obtained. The compound has a rotatory power $[\alpha]_D^{20}=+55°\pm1°$ (concentration: 1% in water). Miller and Waelsch, Archiv. Boichem., Biophys., vol. 35 (1952), page 176, give a rotatory power of $[\alpha]_D^{20}=+53°$ (concentration: 4.6% in water). The crystals are insoluble in most of the organic solvents and soluble in water.

Analysis.—$C_6H_{11}O_4N_3=189.2$. Calculated: 38.1% C; 5.9% H; 22.2% N. Found: 38.3% C; 6.0% H; 22.0 N.

EXAMPLE 8

*Preparation of the benzhydrylamine salt of N-trityl-L-asparaginyl-leucine—Formula III; n=1, $R_1$=NH$_2$*

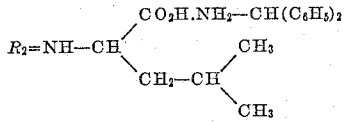

A mixture of 2.25 g. of the diethylamine salt of N-trityl-L-asparagine obtained according to Example 4, 1.3 g. of the hydrochloride of L-leucine benzyl ester, and an additional amount of 0.925 g. of N-trityl-L-asparagine obtained according to Example 3 is subjected to the action of 1.6 g. of dicyclohexyl carbodiimide in 50 cc. of methylene chloride at −10° C. The reaction mixture is worked up as described in Example 5 and the resulting crude N-trityl-L-asparagine-L-leucine benzyl ester is hydrogenolyzed in 50 cc. of absolute alcohol in the presence of 0.3 g. of palladium precipitated on 0.75 g. charcoal and 0.55 cc. of diethylamine. After filtration and evaporation of the alcohol, the residue is dissolved in 50 cc. of water, and a solution of 1.1 g. benzhydrylamine hydrochloride and 10 cc. of hot water is added, whereby 85% of the theoretical amount of the benzhydrylamine salt is obtained which is recrystallized from methanol. The compound crystallizes in the form of flakes and contains solvent of crystallization. It has a melting point of about 120° C. and a rotatory power of $[\alpha]_D^{20}=-18°\pm1°$ (concentration: 2% in chloroform).

The compound is insoluble in water and ether, slightly soluble in benzene, and soluble in alcohol and chloroform.

Analysis.—$C_{42}H_{46}O_4N_4=670.8$. Calculated: 75.2% C; 6.9% H; 8.35% N. Found: 75.0% C; 7.0% H; 8.2% N.

The compound is new.

EXAMPLE 9

*Preparation of L-asparaginyl L-leucine—Formula II; n=1, $R_1$=NH$_2$*

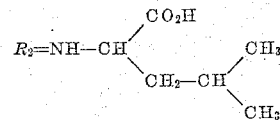

1.8 g. of the benzhydrylamine salt of N-trityl L-asparaginyl-L-leucine obtained according to Example 8, are converted into the free trityl dipeptide by washing its methylene chloride solution with dilute hydrochloric acid. The methylene chloride solution is dried and evaporated to dryness. The residue is taken up with 2 cc. of 50% aqueous acetic acid and stirred at 40° C. for 10 minutes. Acetone is added to the mixture and L-asparaginyl-L-leucine is separated by filtration. The yield is 73% of the theoretical amount. The compound is recrystallized from dilute alcohol. It has a rotatory power of $[\alpha]_D^{20}=-10°\pm1°$ (concentration: 1% in water). Miller, Weidele and Waelsch (Archiv. biochem. biophysics, vol. 56 (1955), page 11) disclose a rotatory power of $[\alpha]_D^{20}=-9.8°$ (concentration: 5% in water). The compound is insoluble in the usual organic solvents and soluble in water.

Analysis.—$C_{10}H_{19}O_4N_3=245.3$. Calculated: 49.0% C; 7.8% H; 17.1% N. Found: 49.2% C; 7.8% H; 17.2% N.

EXAMPLE 10

*Preparation of N-trityl-L-asparaginyl-S-trityl-L-cysteinyl-L-prolyl-L-leucyl glycine methyl ester (Formula III; n=1, R=NH, R=-(S-trityl-L-cysteinyl)-L-prolyl-L-leucyl glycine methyl ester)*

10 g. of the hydrochloride of S-trityl-L-cysteinyl-L-prolyl-L-leucyl-glycine methyl ester obtained according to Velluz et al., Bull. Soc. Chim., 1956, page 1464, 6.8 g. of the diethylamine salt of N-trityl-L-asparagine obtained according to Example 4, 2.85 g. of N-trityl-L-asparagine obtained according to Example 3, and 4.8 g. of dicyclohexyl carbodiimide are condensed in 100 cc. of methylene chloride as described in Example 5.

Unreacted tetrapeptide ester is removed from the reaction mixture in the form of its hydrochloride by washing with hydrochloric acid, while excess N-trityl-L-asparagine is removed by washing with alkaline solutions as indicated in Example 5.

The distillation residue of the alcoholic-ethereal solution is taken up with methylene chloride. The resulting solution is washed with water, dried, and the solvent is evaporated to dryness. The residue is triturated with ether. 14.1 g. (96% of the theoretical amount) of the desired product are obtained. The ester has a rotatory power of $[\alpha]_D^{20} = -77° \pm 2°$ (concentration: 1% in chloroform), is insoluble in water and ether, slightly soluble in benzene, and soluble in alcohol, acetone, and chloroform.

*Analysis.*—$C_{59}H_{64}O_7N_6S = 1001.2$. Calculated: 70.8% C; 6.4% H; 8.4% N; 3.2% S. Found: 70.6% C; 6.5% H; 8.3% N; 3.8% S.

The compound has not yet been described.

EXAMPLE 11

*Preparation of the hydrochloride of L-asparaginyl-S-trityl-L-cysteinyl-L-prolyl-L-leucyl glycine methyl ester (Formula II; n=1, $R_1 = NH_2$, $R_2 = -(S$-trityl-L-cysteinyl$)$-L-prolyl-L-leucyl glycine methyl ester*

13.9 g. of the N,S-ditrityl pentapeptide obtained according to the preceding example are treated with 14 cc. of acetic acid and 14 cc. of N-hydrochloric acid at 40° C. for 10 minutes. The mixture is diluted with 140 cc. of water and precipitated triphenyl carbinol is filtered off. 20 g. of ammonium chloride are added to the filtrate which is then extracted with methylene chloride. After evaporation of the solution to dryness, the crude product is washed with ether and purified by dissolution in 10 cc. of methylene chloride and precipitation with 100 cc. of ether. 10.6 g. (96% of the theoretical amount) of the desired product are obtained. The compound has a rotatory power of $[\alpha]_D^{20} = -23° \pm 2°$ (concentration: 1% in chloroform), is insoluble in ether and benzene, and soluble in water, alcohol, acetone, and chloroform.

This compound is new.

EXAMPLE 12

*Preparation of the diethylamine salt of N-trityl-L-glutamine (Formula III; n=2, $R_1 = NH_2$, $R_2 = OH.NH(C_2H_5)_2$)*

60 g. of N-trityl-L-glutamic acid-γ-monomethyl ester prepared according to Amiard et al., Bull. Soc. Chim., 1956, page 97, are dissolved in 200 cc. of an aqueous concentrated solution of ammonia and 110 cc. of methanol. The solution is cooled to $-10°$ C. and saturated by passing a stream of ammonia therethrough. The reaction mixture is allowed to stand at room temperature under pressure for 65 hours. Ammonia and the methanol are removed from the reaction mixture by distillation in a vacuum at a temperature below 40° C. and the oily residue is dissolved in 200 cc. of chloroform. The solution is stirred at 0° C. with 13 cc. of concentrated hydrochloric acid and then with 150 cc. of N-hydrochloric acid. The chloroform solution is then washed with water, dried, and evaporated to dryness at a temperature below 30° C. The residue is dissolved in 200 cc. of ethyl acetate. When adding 15 cc. of diethylamine, 67 g. (89% of the theoretical amount) of the diethylamine salt of N-trityl-L-glutamine are precipitated. The crude compound is recrystallized from ethyl acetate. The resulting pure compound crystallizes in the form of needles containing solvent of crystallization which melt at 112–114° C., have a rotatory power of $[\alpha]_D^{20} = +12° \pm 2°$ (concentration: 2% in chloroform), and are insoluble in ether, slightly soluble in cold alcohol, and soluble in water, hot alcohol, chloroform, ethyl acetate, and benzene.

*Analysis.*—$C_{28}H_{35}N_3O_3$, $\frac{1}{2}CH_3CO_2C_2H_5 = 505.6$. Calculated: 71.3% C; 7.8% H; 12.7% O; 8.3% N. Found: 71.4% C; 7.7% H; 12.8% O; 8.4% N.

The compound has not yet been described.

EXAMPLE 13

*Preparation of N-trityl-L-glutaminyl glycine (Formula III; n=2, $R_1 = NH_2$, $R_2 = -NH-CH_2-CO_2H$)*

1.95 g. of N-trityl-L-glutamine and 2.4 g. of the diethylamine salt of N-trityl-L-glutamine prepared according to the preceding example are reacted with 1 g. of the hydrochloride of glycine benzyl ester in 30 cc. of methylene chloride at $-10°$ C. in the presence of 2.2 g. of dicyclohexyl carbodiimide for 15 hours. The reaction mixture is worked up as described in Example 5 and the crude product is purified by dissolution in a mixture of ether and alcohol (10:1) and washing of the resulting solution with 15% aqueous alcohol containing small amounts of hydrochloric acid and then with 15% aqueous alcohol containing small amounts of ammonia as it is described in detail in Example 5.

Hydrogenolysis of the benzyl ester group is carried out by dissolving the crude product in 25 cc. of 95% aqueous alcohol in the presence of palladium precipitated on charcoal and 0.5 cc. of diethylamine. The reaction mixture is worked up as described in the preceding examples and the residue is dissolved in 40 cc. of water. The solution is washed with ether in order to remove neutral compounds. The washed aqueous solution is acidified by means of hydrochloric acid in the presence of methylene chloride. From the separated methylene chloride solution 1.6 g. (70% calculated to glycine benzyl ester) of N-trityl-L-glutaminyl glycine are obtained in crystalline form. The crude compound is recrystallized from a mixture of alcohol, methylene chloride, and petroleum ether (1:4:20). The resulting colorless needles melt at about 130° C., have a rotatory power of $[\alpha]_D^{20} = +25° \pm 1$ (concentration: 1% in absolute alcohol), and are insoluble in water and ether, slightly soluble in chloroform, acetone, and benzene, and soluble in alcohol.

*Analysis.*—$C_{26}H_{27}O_4N_3 = 445.5$. Calculated: 70.1% C; 6.1% H; 9.4% N. Found: 70.1% C; 6.2% H; 9.4% N.

The compound is new.

EXAMPLE 14

*Preparation of L-glutaminyl glycin (Formula II; N=2, $R_1 = NH_2$, $R_2 = -NH-CH_2-CO_2H$)*

0.3 g. of N-trityl-L-glutaminyl glycine obtained according to the preceding example are subjected to the action of 0.6 cc. of 50% aqueous acetic acid at 35° C. for 10 minutes. On addition of 10 cc. of alcohol and recrystallization from aqueous alcohol, 0.11 g. (80% of the theoretical amount) of the desired compound are obtained. It crystallizes in the form of needles, has a rotatory power of $[\alpha]_D^{20} = +81° \pm 2°$ (concentration: 1% in water), and is insoluble in alcohol, ether, acetone, benzene, and chloroform, and soluble in water. Melville, Biochem. J., vol. 29 (1935), page 179, discloses a rotatory power of $[\alpha]_D^{20} = +76°$ and Miller and Waelsch, Arshiv. biochem. biophysics, vol. 35 (1952), page 176, disclose a rotatory power of $[\alpha]_D^{20} = +77°$.

*Analysis.*—$C_7H_{13}O_4N_3 = 203.2$. Calculated: 41.4% C; 6.45% H; 20.7% N. Found: 41.6% C; 6.3% H; 20.5% N.

EXAMPLE 15

*Preparation of L-glutaminyl-L-leucine—Formula II; n=2, $R_1 = NH_2$*

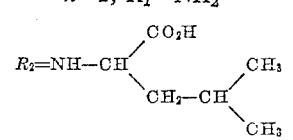

2 g. of N-trityl-L-glutamine and 2.4 g. of the diethylamine salt of N-trityl-L-glutamine are condensed with 1.3 g. of the hydrochloride of L-leucine benzyl ester and 30 cc. of methylene chloride at $-10°$ C. in the presence of 2.2 g. of dicyclohexyl carbodiimide and the reaction mixture is worked up as described in the preceding examples. The crude product is hydrogenolyzed in 25 cc. of 95% alcohol in the presence of palladium precipitated on charcoal and 0.5 cc. of diethylamine. The catalyst is separated from the reaction mixture by filtration and the alcohol is evaporated. The residue is dissolved in water. N-trityl-L-glutaminyl-L-leucine is set free from its diethylamine salt by means of dilute hydrochloric acid. The solution is extracted with methylene chloride. After purification from a mixture of ether and petroleum ether (1:2), 1.75 g. (70% of the theoretical amount) of N-trityl-L-glutaminyl-L-leucine are obtained.

1 g. of the trityl compound obtained as described hereinabove is detritylated by heating in 2 cc. of 50% aqueous acetic acid at 40° for 10 minutes. The dipeptide compound is precipitated by the addition of absolute alcohol. The yield is 0.3 g. (70% of the theoretical amount). The crude compound is purified by dissolution in aqueous alcoholic sodium hydroxide solution and acidification by the addition of acetic acid. The resulting compound crystallizes in the form of brilliant platelets and has a rotatory power of $[\alpha]_D^{20} = +4.5° \pm 1°$ (concentration: 2% in N hydrochloric acid). Sondheimer and Holley, J. Am. Chem. Soc., vol. 76 (1954), page 2816, disclose a rotatory power of $[\alpha]_D^{22} = +11.5°$ (concentration: 1% in N hydrochloric acid). The compound is insoluble in alcohol, ether, acetone, benzene, and chloroform, slightly soluble in water, and soluble in dilute aqueous alkali metal hydroxide solutions and acids.

*Analysis.*—$C_{11}H_{21}O_4N_3 = 259.3$. Calculated: 50.95% C; 8.2% H; 24.7% O; 16.2% N. Found: 50.9% C; 8.1% H; 24.5% O; 16.2% N.

EXAMPLE 16

*Preparation of the hydrochloride of L-asparagine benzyl ester (Formula II; $n=1$, $R_1=NH_2$, $R_2=O-CH_2-C_6H_5$)*

A rapid stream of gaseous hydrochloric acid is passed through a suspension of 14 g. of N-trityl-L-asparagine benzyl ester in 42 cc. of chloroform. First solution takes place and then the hydrochloride precipitates. After standing for 5 minutes at room temperature, 150 cc. of ether are added and the precipitate is separated by filtration. It is recrystallized from a mixture of methanol and ethyl acetate (1:1). The yield is 92% of the theoretical amount. The compound melts at 125° C., has a rotatory power of $[\alpha]_D^{25} = 0° \pm 1°$ (concentration: 2% in water), and is insoluble in ether, slightly soluble in acetone, benzene, and chloroform, and soluble in water and alcohol.

*Analysis.*—$C_{11}H_{15}O_3N_2Cl = 258.7$. Calculated: 51.1% C; 5.8% H; 10.8% N; 13.7% Cl. Found: 51.4% C; 5.9% H; 10.3% N; 13.8% Cl.

The compound is new.

EXAMPLE 17

*Preparation of N-trityl-L-glutaminyl-L-asparagine benzyl ester—Formula III; $n=2$, $R_1=NH_2$*

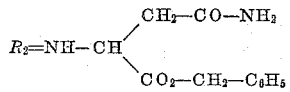

2 g. of N-trityl-L-glutamine and 2.4 g. of the diethylamine salt of N-trityl-L-glutamine are condensed with 1.3 g. of the hydrochloride of L-asparagine benzyl ester in 30 cc. of methylene chloride at −10° C. in the presence of 2.2 g. of dicyclohexyl carbodiimide as described in the preceding examples. The reaction mixture is worked up as described hereinabove and the crude reaction product is taken up with 10 cc. of benzene and 5 cc. of water. It crystallizes in the form of a hydrate. The yield is 70% of the theoretical amount. The crude compound is recrystallized from aqueous ethoxy ethanol and then from a mixture of ethyl acetate and petroleum ether (1:10). The compound melts at 170° C., has a rotatory power of $[\alpha]_D^{25} = -5.5° \pm 1°$ (concentration: 1% in absolute alcohol), and is insoluble in water, slightly soluble in ether and benzene, and soluble in alcohol, acetone, and chloroform.

*Analysis.*—$C_{35}H_{26}O_5N_4 = 592.7$. Calculated: 70.9% C; 6.1% H; 13.5% O; 9.45% N. Found: 71.0% C; 6.2% H; 13.7% O; 9.6% N.

The compound has not yet been described in the literature.

EXAMPLE 18

*Preparation of L-glutaminyl-L-asparagine—Formula II; $n=2$, $R_1=NH_2$*

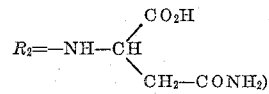

1 g. of N-trityl-L-glutaminyl-L-asparagine benzyl ester obtained according to the preceding example is hydrogenolyzed in 20 cc. of 95% ethanol in the presence of 0.2 g. of palladium precipitated on 0.5 g. charcoal and 0.2 cc. of diethylamine. After separation of the catalyst by filtration and evaporation of the solvent, N-trityl-L-glutaminyl-L-asparagine is set free from the diethylamine salt by taking up the residue with water, acidifying the solution by the addition of acetic acid, and extracting the mixture with methylene chloride.

The resulting crude N-trityl-L-glutaminyl-L-asparagine is detritylated by heating it with 2 cc. of 50% aqueous acetic acid at 35° C. for 10 minutes. The desired dipeptide compound is precipitated by the addition of acetone. The yield is 60% of the theoretical amount. The crude compound is recrystallized from dilute alcohol. The resulting L-glutaminyl-L-asparagine has a rotatory power of $[\alpha]_D^{25} = +24° \pm 2°$ (concentration: 1% in water). Swan and Du Vigneaud, J. Am. Chem. Soc., vol. 76 (1954), page 3110, disclose a rotatory power of $[\alpha]_D^{21} = +17.1°$ (concentration: 1.5% in water). The compound is insoluble in alcohol, ether, acetone, benzene, and chloroform, and soluble in water, aqueous acids, and aqueous alkali metal hydroxide solutions.

*Analysis.*—$C_9H_{16}O_5N_4 = 260.2$. Calculated: 41.5% C; 6.2% H; 21.5% N. Found: 41.3% C; 6.2% H; 21.4% N.

EXAMPLE 19

*Preparation of N-trityl-L-glutaminyl-L-asparaginyl-(S-trityl-L-cysteinyl)-L-prolyl-L-leucyl glycine methyl ester (Formula III; $n=2$, $R_1=NH_2$, $R_2=L$ - asparaginyl - S-trityl-L-cysteinyl-L-prolyl-L-leucyl glycine methyl ester) (Method A)*

10.6 g. of hydrochloride of the S-trityl pentapeptide ester obtained as described in Example 11 are subjected to the action of 6 g. of the diethylamine salt of N-trityl-L-glutamine, 5.1 g. of N-trityl glutamine, and 5.3 g. of dicyclohexylcarbodiimide in 100 cc. of methylene chloride at −10° C. for 45 hours. The reaction mixture is worked up as described in the preceding examples and the crude reaction product is purified by dissolving it in a mixture of alcohol and ether (1:10) and washing the resulting solution successively with 15% aqueous alcohol acidified with hydrochloric acid, with 15% aqueous alcohol, and with 15% aqueous alcohol containing small amounts of ammonia as it is described in detail in Example 5. Finally 12.1 g. of the desired compound are obtained. It is purified by recrystallization from a mixture of methanol and ether (1:10). The yield is 10.8 g. (72% of the theoretical amount). The compound has a rotatory power of $[\alpha]_D^{20} = -35° \pm 2°$ (concentration: 1% in chloroform). 10% of the hydrochloride of the pentapeptide used as starting material can be recovered from the acid extraction solutions whereby the yield is increased to 82% of the theoretical amount.

The compound is insoluble in water and ether, slightly soluble in benzene, and soluble in alcohol, acetone, and chloroform.

*Analysis.*—$C_{64}H_{72}O_9N_8S = 1,129.35$. Calculated: 68.1% C; 6.4% H; 9.9% N. Found: 67.7% C; 6.4% H; 9.8% N.

The compound is new.

EXAMPLE 20

*Preparation of N-trityl-L-isoglutaminyl glycine benzyl ester (Formula III; n=2, $R_1$=NH—$CH_2$—$CO_2$—$CH_2$—$C_6H_5$, $R_2$=$NH_2$)*

3.9 g. of N-trityl-L-isoglutamine are reacted with 1 g. of the hydrochloride of glycine benzyl ester in 20 cc. of methylene chloride at —10° C. for 15 hours in the presence of 0.5 cc. of diethylamine and 2.2 g. of dicyclohexyl carbodiimide. The reaction mixture is worked up as described in the preceding examples. The crude reaction product is dissolved in a mixture of alcohol and ether (1:10). The resulting solution is washed with 15% aqueous alcohol containing small amounts of sodium hydroxide and then with 15% aqueous alcohol containing small amounts of hydrochloric acid. On evaporation of the ether, 1.95 g. (72% calculated for glycine benzyl ester) are obtained. The crude material is recrystallized from a mixture of methylene chloride and ether (1:9). The compound which crystallizes in the form of colorless needles, has a melting point of about 160° C., a rotatory power of $[\alpha]_D^{20}$=+27°±1° (concentration: 1% in chloroform), and is insoluble in water, slightly soluble in ether and benzene, and soluble in alcohol, acetone, and chloroform.

*Analysis.*—$C_{33}H_{33}O_4N_3$=535.6. Calculated: 74.0% C; 6.2% H; 7.85% N; 11.95% O. Found: 74.3% C; 6.2% H; 7.8% N; 11.7% O.

The compound is new.

EXAMPLE 21

*Preparation of N-trityl-L-isoglutaminyl glycine (Formula III; n=2, $R_1$=—NH—$CH_2$—$CO_2H$, $R_2$=—$NH_2$)*

1 g. of N-trityl-L-isoglutaminyl glycine benzyl ester obtained according to Example 20 is hydrogenolyzed in 20 cc. of 90% aqueous alcohol containing 0.2 cc. of diethylamine in the presence of 0.2 g. of palladium precipitated on 0.5 g. charcoal. After separation of the catalyst by filtration and evaporation of the alcohol the residue is taken up in 10 cc. of chloroform and 2 cc. of N hydrochloric acid. 0.8 g. (95% of the theoretical amount) of a compound containing small amounts of solvent after drying at 80° C. in a vacuum are obtained thereby. The compound melts at 175° C., has a rotatory power of $[\alpha]_D^{20}$=+55°±1° (concentration: 1% in absolute alcohol), and is insoluble in water and ether, slightly soluble in acetone, benzene, and chloroform, and soluble in alcohol.

*Analysis.*—$C_{26}H_{27}O_4N_3$, $8/100 CHCl_3$=455.1%. Calculated: 68.8% C; 6.0% H; 14.1% O; 9.2% N; 1.9% Cl. Found: 69.0% C; 6.0% H; 14.5% O; 9.1% N; 2% Cl.

The compound is new.

EXAMPLE 22

*Preparation of L-isoglutaminyl glycine (Formula II; n=2, $R_1$=—NH—$CH_2$—$CO_2H$, $R_2$=$NH_2$)*

0.5 g. of N-trityl-L-isoglutaminyl glycine are stirred with 1 cc. of 50% aqueous acetic acid and 0.5 cc. of acetone at 30° C. for 15 minutes. Acetone is added to the reaction mixture. The precipitate is separated by filtration and washed with acetone. The yield is 0.2 g. (90% of the theoretical amount) of the desired peptide which is recrystallized from dilute alcohol. It has a rotatory power of $[\alpha]_D^{20}$=+17°±2° (concentration: 1% in water). The compound contains a small amount of glutaminyl glycine. It is insoluble in alcohol, ether, acetone, benzene, and chloroform and soluble in water, dilute aqueous acids and dilute aqueous alkali metal hydroxide solutions.

Swan (Proceedings of International Wool Textile Research Conference, Australia, 1955) discloses a rotatory power of $[\alpha]_D^{21.5}$=+15.3° (concentration: 2% in water).

EXAMPLE 23

*Preparation of L-isoglutaminyl-L-leucine—Formula II; n=2*

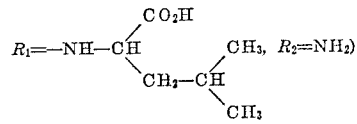

3.9 g. of N-trityl-L-isoglutamine are reacted with 1.3 g. of the hydrochloride of L-leucine benzyl ester in 20 cc. of methylene chloride at —10° C. in the presence of 0.5 cc. of diethylamine and 2.2 g. of dicyclohexyl carbodiimide. The reaction mixture is worked up as described in the preceding examples and the crude reaction product is hydrogenolyzed in 20 cc. of 95% aqueous alcohol in the presence of 0.5 cc. of diethylamine and 0.4 g. of palladium precipitated on 1 g. charcoal. After separation of the catalyst by filtration, the solution is evaporated to dryness in a vacuum, the resulting residue is taken up with 100 cc. of water, and the pH of the resulting solution is adjusted to a pH of 3.0 to 4.0 by the addition of acetic acid. The solution is extracted with methylene chloride. After drying and evaporating the methylene chloride, the residue is taken up with petroleum ether and the resulting crystals are filtered off. 2 g. (80% of the theoretical amount) of N-trityl-L-isoglutaminyl-L-leucine are obtained.

The compound which is amorphous is detritylated by heating it with 4 cc. of 50% aqueous acetic acid at 40–50° C. for 45 minutes. By the addition of 200 cc. of acetone, 0.35 g. (34% of the theoretical amount) of L-isoglutaminyl-L-leucine are obtained. After recrystallization from aqueous acetone, the compound has a melting point of about 180° C. and a rotary power of $$[\alpha]_D^{25}=+2°\pm1°$$

(concentration: 2% in 50% aqueous alcohol). It is insoluble in alcohol, ether, acetone, and benzene, and soluble in water, dilute aqueous acids and dilute aqueous alkali metal hydroxide solution.

*Analysis.*—$C_{11}H_{21}O_4N_3$=259.3. Calculated: 50.96% C; 8.2% H; 16.2% N. Found: 51.0% C; 8.1% H; 16.3% N.

The compound is new.

EXAMPLE 24

*Preparation of (N-trityl-L-glutaminyl)-L-asparaginyl-(S-trityl-L-cysteinyl)-L-propyl-L-leucyl glycine methyl ester (Formula III; n=2, $R_1$=$NH_2$, $R_2$=L-asparaginyl-(S-trityl-L-cysteinyl)-L-prolyl-L-leucyl glycine methyl ester). (Method B)*

2.9 g. of the crude diethylamine salt of (N-trityl-L-glutaminyl)-L-asparagine obtained by catalytic hydrogenation of N-trityl-L-glutaminyl-L-asparagine benzyl ester in the presence of palladium precipitated on charcoal and diethylamine, according to Example 18, are treated in 20 cc. of methylene chloride with 5 cc. of N hydrochloric acid. The methylene chloride solution is decanted and dried over sodium sulfate. 5.75 g. of the crude diethylamine salt of (N-trityl-L-glutaminyl)-L-asparagine and 6.81 g. of the hydrochloride of the (S-trityl-L-cysteinyl)-L-propyl-L-leucyl glycine methyl ester are dissolved in said solution. After cooling to —10° C., 3.2 g. of dicyclohexyl carbodiimide are added and the solution is allowed to stand at —10° C. overnight. Dicyclohexyl urea is filtered off, the filtrate is evaporated to dryness in a vacuum, and the residue is dissolved in 20 cc. of absolute alcohol. After the addition of 200 cc. of ether, the solution is washed six times with 30 cc. of 15% aqueous alcohol whereby the first wash liquid contains 5 cc. of N hydrochloric acid. The solution is then washed twice with 30 cc. of 15% aqueous alcohol containing 5 cc. of N ammonia. The washed ethereal-alcoholic solution is dried over sodium sulfate, concentrated by evaporation to sirupy consistency, and redissolved in 20 cc. of methylene chloride. The solution is washed with 50 cc. of water, dried over sodium sulfate, evaporated to dryness, triturated with ether, and filtered with suction. The resulting crude product is dissolved in 8 cc. of methanol and precipitated by the addition of 250 cc. of ether. Thereby, 8.7 g. (80% of the theoretical yield) of N-trityl-L-glutaminyl-L-asparaginyl-(S-trityl-L-cysteinyl) - L - prolyl-L-leucyl glycine methyl ester are obtained which compound is identical in all respects with the product obtained according to Example 19. It has a rotatory power of $[\alpha]_D^{20} = -35° \pm 1$ (concentration: 1% in chloroform).

*Analysis.* — $C_{64}H_{72}O_9N_8S = 1,129.35$. Calculated: 68.06% C; 6.42% H; 9.92% N. Found: 68.2% C; 6.5% H; 9.8% N.

The (S-trityl-L-cysteinyl)-L-prolyl-L-leucyl glycine methyl ester used as the one reactant is obtained, for instance, as described in Examples 11 to 16 of copending application Serial No. 649,520, filed March 29, 1957, now Patent No. 2,938,891, and entitled "Method of Making Oxytocin and Intermediates Thereof."

We claim:

1. The methyl ester of [N-trityl-L-asparaginyl]-[S-trityl-L-cysteinyl]-L-prolyl-L-leucyl glycine.

2. The benzyl ester of [N-trityl-L-glutaminyl]-L-asparagine.

3. The methyl ester of [N-trityl-L-glutaminyl]-L-asparaginyl-[S-trityl cysteinyl]-L-prolyl-L-leucyl glycine.

4. In a process of producing the methyl ester of the hexapeptide (N-trityl glutaminyl) asparaginyl-(S-trityl cysteinyl) prolyl leucyl glycine, the steps which comprise reacting, in methylene chloride, a mixture of N-trityl asparagine and the diethylamine salt of N-trityl asparagine at a temperature between —10° C. and 0° C. with the hydrochloride of the methyl ester of S-trityl cysteinyl prolyl leucyl glycine with the addition of dicyclohexyl carbodiimide, separating the precipitated dicyclohexyl urea by filtration, heating the resulting methyl ester of N-trityl asparaginyl-S-trityl cysteinyl prolyl leucyl glycine with an aqueous 50% acetic acid solution containing hydrochloric acid to split off the N-trityl group, reacting the resulting hydrochloride of the methyl ester of the S-trityl pentapeptide, in methylene chloride, at a temperature between —10° C. and 0° C. with a mixture of N-trityl glutamine and the diethylamine salt of N-trityl glutamine with the addition of dicyclohexyl carbodiimide separating the precipitated dicyclohexyl urea by filtration from the solution containing the methyl ester of (N-trityl glutaminyl) asparaginyl-(S-trityl cysteinyl) prolyl leucyl glycine, and isolating said ester from said solution.

5. In a process of producing the methyl ester of the hexapeptide (N-trityl glutaminyl) asparaginyl - (S - trityl cysteinyl) prolyl leucyl glycine, the steps which comprise reacting, in methylene chloride, a mixture of N-trityl glutamine and the diethylamine salt of N-trityl glutamine at a temperature between —10° C. and 0° C. with the hydrochloride of the benzyl ester of asparagine with the addition of dicyclohexyl carbodiimide, separating the precipitated dicyclohexyl urea by filtration, treating the resulting benzyl ester of (N-trityl glutaminyl) asparagine in alcoholic solution with hydrogen in the presence of palladium catalyst and diethylamine to split off the benzyl group, reacting in methylene chloride, a mixture of (N-trityl glutaminyl) asparagine and the diethylamine salt of (N-trityl glutaminyl) asparagine at a temperature between —10° C. and 0° C. with the hydrochloride of the methyl ester of (S-trityl cysteinyl) prolyl leucyl glycine with the addition of dicyclohexyl carbodiimide, separating the precipitated dicyclohexyl urea by filtration from the solution containing the methyl ester of (N-trityl glutaminyl) asparaginyl-(S-trityl cysteinyl) prolyl leucyl glycine, and isolating said ester from said solution.

References Cited in the file of this patent

Benary: Ber. Deut. Chem., vol. 54, pp. 1324–7 (1924).

Helferick: Ber. Deut. Chem., vol. 58, pp. 882–5 (1925).

Hillmann-Elies et al.: Zeit. für Naturforschung, 8b, pages 445–6 (1953).

Sheehan: J. Am. Chem. Soc., vol. 77, pp. 1067–8 (1955).

Anson: Advances in Protein Chemistry, vol. XII (1957), pp. 463, 517, 518, 568, 570, 623.